May 18, 1948.  F. C. ZIMMERMAN  2,441,610
GLUE CONVERTER
Filed July 31, 1945

Inventor
Frances C. Zimmerman,
By Wilfred E. Lawson
Attorney

Patented May 18, 1948

2,441,610

UNITED STATES PATENT OFFICE 2,441,610

GLUE CONVERTER

Frances C. Zimmerman, Cincinnati, Ohio

Application July 31, 1945, Serial No. 607,953

4 Claims. (Cl. 126—284)

The present invention relates to improvements in glue converters and particularly to apparatus such as illustrated in my prior Patent No. 1,667,339, granted April 24, 1928.

My prior patent has proven valuable and satisfactory; however, I have discovered that by combining and adding novel parts an improved glue converter results. For example, my prior patent included a glue jelly converting vessel sometimes termed a glue melting vessel and a catch basin for the melted glue with a beaded rim adapted to provide a seal between the interiors of the catch basin and the melting vessel. This seal when made tight has been satisfactory, however, to effect the seal, the two parts, that is, the melting vessel and the catch basin, must be properly positioned one upon the other, and there are occasions when a more careless user of the converter may not properly position the parts to effect a seal. If a good seal between the parts is not made, this allows steam and condensation to mix with the glue and thin it to an undesirable consistency.

Accordingly, one object of the present invention is to provide a novel improved arrangement between the converting or melting vessel and the catch basin, whereby even careless use of the device will not disturb the seal between the catch basin and the melting vessel.

Another object is to provide a novel combined steam tight unit which includes both the melting vessel and the catch basin, so that they may be removed as one unit from the steam tank.

Still another object is to provide a novel improvement in the arrangement of the bottom of the converter or melting vessel with respect to its mounting in the apparatus over the catch basin.

Other objects and advantages of my invention will appear in the course of the following description.

My invention is illustrated in the accompanying drawings, wherein—

Figure 1:
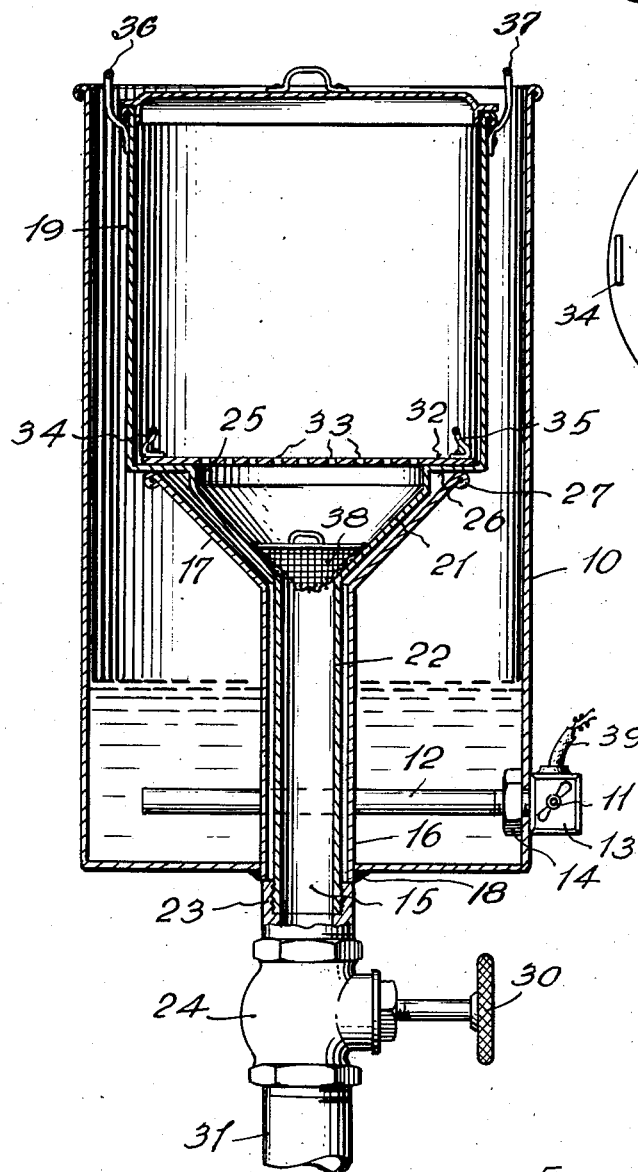
Figure 1 is a vertical cross section view through a glue converter including my improved construction.
Figure 2:
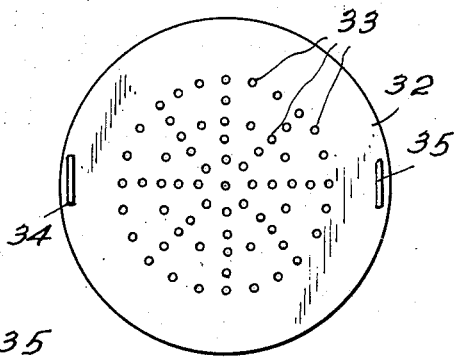
Figure 2 is a top plan view of the detachable bottom portion of the converter or melting vessel.
Figure 3:
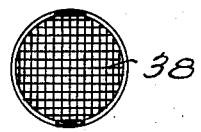
Figure 3 is a top plan view of a removable glue filter shown installed in the glue outlet pipe in Figure 1.

Referring to the drawings in detail, and first with particular reference to Figure 1, there is shown a tank 10 adapted to contain a quantity of water to be heated and converted into steam. Extending into the tank 10 and coupled to an electrical switch 11 mounted outside the tank is an electrical heating element 12 adapted to heat the water in tank 10.

This switch is housed in a box 13 and is coupled to the electrode elements of the heater 12 by suitable means, such as a nut 14.

The tank 10 may be open at the top with a centrally disposed opening 15 in the bottom. The opening 15 is arranged to receive the end of a pipe or tube 16, which flares upwardly and outwardly inside the steam tank 10 to provide a funnel 17, hereinafter called the outer catch basin. This outer catch basin 17 serves to support my novel unit in its proper position for operation, and it also serves as a drip catcher for melted glue during removal of the unit from the tank 10 for cleaning or the like. The outer diameter of tube 16 which projects through opening 15 is made fluid-tight in the opening 15, by suitable means, such as solder 18.

My novel unit comprises an upper converter or melting vessel 19 for the glue, an integrally attached catch basin 21, and an integrally attached outlet tube 22 having an exteriorly threaded end portion 23 adapted to couple in a valve housing 24. The several integral portions of my novel unit are constructed for cooperative positioning with the outer catch basin 17 and in relation to the interior walls of the steam tank 10. For example, the bottom of the converter vessel 19 has an aperture that opens into the catch basin 21. This opening is defined by a depending flange 25 integrally connected from the bottom of vessel 19 to the top rim of the inner catch basin 21, so that there is provided an annular surface 26 around the flange 25 that coactively seats on the bead 27 around the rim of the outer catch basin 17. The flange 25 is of sufficient width to position the funnel-shaped inner catch basin 21 in spaced relation with the interior of the funnel or outer catch basin 17. Thus clearance is provided for connecting the unit into valve housing 24 by the threads 23 on the end of tube 22.

The valve housing 24 is provided with a valve operating means, such as hand wheel 30. The outlet side of the valve housing 24 is suitably coupled to the pipe 31 by which the glue is run into the usual trough, not shown, leading to the bindery machine, not shown.

The aperture in the bottom of the converter vessel 19, defined by annular surface 26, has a detachable bottom plate 32. This plate is provided with a plurality of perforations 33 and a pair of handles 34 and 35. Also, suitably secured to the outer upper side of vessel 19 is another pair of handles 36 and 37 for lifting out the vessel 19 and the inner catch basin 21 with the bottom plate 32 and a filter member 38 when the outlet tube 22 is uncoupled from valve housing 24.

*Operation*

The operation is generally apparent from the foregoing description; for example, glue jelly to be melted is loaded into vessel 19. The switch 11 is turned on to supply current from a suitable source of power, not shown, through cable 39, to the heating electrodes 12. Steam is thus generated in tank 10, which steam circulates around the converter vessel 19 and provides for very rapidly melting the glue jelly in vessel 19. The melted glue settles down through the perforations 33 in bottom 32 and the filter 38, out the outlet pipe 22 to the valve housing 24.

As hereinbefore briefly mentioned, the valve, not shown, in the housing 24 may be controlled by handle 30, so as to feed glue directly to a binder machine or the like.

Due to the unitary construction of the glue holding parts 19, 21, and 22, no steam or condensation can intermingle with the glue. Also, once the steam has developed in the tank 10, the melting of the glue is substantially instantaneous.

While I have referred to the present improvements as adaptable for direct connection to a binder, it may also be connected to a glue storage vessel or the like, as shown in my prior patent. To determine the scope of my invention, reference should be had to the appended claims.

I claim:

1. In a glue converter and melter of the character described having an outer tank and means for generating steam therein; a vertically extended outer catch basin open at its upper end having a diameter less than the diameter of the said tank and having a discharge pipe extending through the bottom of the tank, a unit comprising a glue melting vessel with an opening in its bottom portion and an inner catch basin integrally connected to the bottom around the opening therein, said vessel having an outer portion of its bottom adapted to rest on the outer catch basin, a perforated plate over said opening in the bottom of the melting vessel, said inner catch basin having an outlet pipe extending through the bottom of the said tank coaxially within the discharge pipe of said outer catch basin, and a valve housing coupled to the end of said outlet pipe of the inner catch basin to regulate the passage of glue from the melting vessel.

2. In a glue converter and melter of the character described having an outer tank and means for generating steam therein; a vertically extended outer catch basin open at its upper end having a diameter less than the diameter of the said tank and having a discharge pipe extending through the bottom of the tank, a unt comprising a glue melting vessel with an opening in its bottom portion and an inner catch basin integrally connected to the bottom around the opening therein, said vesssel having an outer portion of its bottom adapted to rest on the outer catch basin, a perforated plate over said opening in the bottom of the melting vessel, said inner catch basin having an outlet pipe extending through the bottom of the said tank coaxially within the discharge pipe of said outer catch basin, a valve housing removably coupled to the end of said outlet pipe of the inner catch basin to regulate the passage of glue from the melting vessel, the said removable coupling between the valve housing and said outlet pipe being adapted to draw the said outer portion into tight contact with the outer catch basin, and means carried by said melting vessel to facilitate turning the vessel and uncoupling the said outlet pipe from said valve housing whereby the unit may be removed from said tank.

3. In a glue converter and melter of the character described having an outer tank; a vertically disposed outer catch basin within the tank and in the form of a funnel having an open top and a discharge pipe extending through the bottom of the tank, a valve housing disposed beneath the tank and having said discharge pipe coupled therewith, a glue melting vessel having an overall width greater than the open top of said outer catch basin and having a bottom adapted to rest upon the edge of the open top of the catch basin, said vessel having a central opening in its bottom, a substantially conical inner catch basin joined to the vessel bottom at the edge of said opening and adapted to extend downwardly into the outer catch basin, an outlet pipe extending from the bottom of said inner catch basin and passing coaxially through said discharge pipe, a threaded coupling between the lower end of the inner catch basin discharge pipe and said valve housing whereby the bottom of the vessel is maintained in tight contact with the edge of the outer catch basin, and a foraminous member in the lower part of the vesssel through which melted glue passes to the outlet pipe of the inner catch basin.

4. In a glue converter and melter of the character described having an outer tank; a vertically disposed outer catch basin within the tank and in the form of a funnel having an open top and a discharge pipe extending through the bottom of the tank, a valve housing disposed beneath the tank and having said discharge pipe coupled therewith, a glue melting vessel having an overall width greater than the open top of said outer catch basin and having a bottom adapted to rest upon the edge of the open top of the catch basin, said vessel having a central opening in its bottom, a substantially conical inner catch basin joined to the vessel bottom at the edge of said opening and adapted to extend downwardly into the outer catch basin, an outlet pipe extending from the bottom of said inner catch basin and passing coaxially through said discharge pipe, a threaded coupling between the lower end of the inner catch basin discharge pipe and said valve housing whereby the bottom of the vessel is maintained in tight contact with the edge of the outer catch basin, a perforated plate lying upon the bottom of the vessel and overlying the opening therein leading to the inner catch basin, and a strainer lying in the lower part of the inner catch basin at the entrance to the inner catch basin outlet pipe.

FRANCES C. ZIMMERMAN.

REFERENCES CITED

The following references are of record in the file of this patent:

UNITED STATES PATENTS

| Number | Name | Date |
|---|---|---|
| 190,604 | Maloney | May 8, 1877 |
| 1,055,506 | Angebrandt | Mar. 11, 1913 |
| 1,194,744 | Kahrs | Aug. 15, 1916 |
| 1,527,771 | Baer et al. | Feb. 24, 1925 |
| 1,630,103 | Young | May 24, 1927 |
| 1,667,339 | Zimmerman | Apr. 24, 1928 |
| 1,675,397 | Wild | July 3, 1928 |